United States Patent
Saito

(10) Patent No.: US 10,227,036 B2
(45) Date of Patent: Mar. 12, 2019

(54) VEHICLE LAMP

(71) Applicant: KOITO MANUFACTURING CO., LTD., Tokyo (JP)

(72) Inventor: Norikazu Saito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/908,639

(22) PCT Filed: Jul. 16, 2014

(86) PCT No.: PCT/JP2014/068928
§ 371 (c)(1),
(2) Date: Jan. 29, 2016

(87) PCT Pub. No.: WO2015/016068
PCT Pub. Date: Feb. 5, 2015

(65) Prior Publication Data
US 2016/0169471 A1 Jun. 16, 2016

(30) Foreign Application Priority Data
Aug. 2, 2013 (JP) .................. 2013-161629

(51) Int. Cl.
| | |
|---|---|
| *B60Q 1/00* | (2006.01) |
| *B60Q 1/14* | (2006.01) |
| *B60Q 1/34* | (2006.01) |
| *F21S 41/147* | (2018.01) |
| *F21S 43/14* | (2018.01) |
| *F21S 45/10* | (2018.01) |

(Continued)

(52) U.S. Cl.
CPC .............. *B60Q 1/34* (2013.01); *B60Q 1/0023* (2013.01); *B60Q 1/0041* (2013.01);
(Continued)

(58) Field of Classification Search
CPC ..... B60Q 1/1415; B60Q 1/1423; F21V 5/007; F21Y 2105/10; F21S 45/48
See application file for complete search history.

(56) References Cited

U.S. PATENT DOCUMENTS 6,152,590 A * 11/2000 Furst .................... B60Q 1/2665
362/249.02
7,868,563 B2 * 1/2011 Ito .......................... H05B 33/08
315/299
(Continued)

FOREIGN PATENT DOCUMENTS

| JP | 2000-322908 A | 11/2000 |
|---|---|---|
| JP | 2002-124123 A | 4/2002 |

(Continued)

OTHER PUBLICATIONS

International Search Report issued in PCT/JP2014/068928 dated Aug. 19, 2014 (2 pages).
(Continued)

*Primary Examiner* — Jong-Suk (James) Lee
*Assistant Examiner* — Eric T Eide
(74) *Attorney, Agent, or Firm* — Osha Liang LLP

(57) ABSTRACT

A vehicle lamp has a lamp housing, a lamp unit having a light source and disposed in a lamp chamber formed as an internal space of the lamp housing, and a controller configured to output a drive current that drives a light emission of the light source. The controller has a temperature detector. The controller is configured to control a current amount of the drive current on the basis of a detection result of the temperature detector. The controller is disposed above the light source.

17 Claims, 4 Drawing Sheets

(51) Int. Cl.
*F21S 45/42* (2018.01)
*F21S 45/48* (2018.01)
*F21S 41/32* (2018.01)
*F21S 41/50* (2018.01)
*F21S 43/50* (2018.01)
*F21S 45/47* (2018.01)

(52) U.S. Cl.
CPC ......... *B60Q 1/1415* (2013.01); *B60Q 1/1423* (2013.01); *F21S 41/147* (2018.01); *F21S 43/14* (2018.01); *F21S 45/10* (2018.01); *F21S 45/42* (2018.01); *F21S 45/48* (2018.01); *F21S 41/321* (2018.01); *F21S 41/50* (2018.01); *F21S 43/50* (2018.01); *F21S 45/47* (2018.01)

(56) References Cited

U.S. PATENT DOCUMENTS

| 7,993,045 | B2* | 8/2011 | Nakamura | B60Q 1/1407 315/77 |
|---|---|---|---|---|
| 2004/0179368 | A1 | 9/2004 | Takeda et al. | |
| 2006/0274544 | A1 | 12/2006 | Inoue et al. | |
| 2007/0025117 | A1* | 2/2007 | Watanabe | F21S 48/1159 362/545 |
| 2012/0161633 | A1 | 6/2012 | Nishitani et al. | |
| 2013/0044477 | A1* | 2/2013 | Lee | F21S 48/321 362/235 |

FOREIGN PATENT DOCUMENTS

| JP | 2004-276738 A | 10/2004 |
|---|---|---|
| JP | 2006-335328 A | 12/2006 |
| JP | 2007-055424 A | 3/2007 |
| JP | 2010-257760 A | 11/2010 |
| JP | 2012-138294 A | 7/2012 |

OTHER PUBLICATIONS

Written Opinion of the International Searching Authority issued in PCT/JP2014/068928 dated Aug. 19, 2014 (4 pages).

* cited by examiner

VEHICLE LAMP

CROSS-REFERENCE TO RELATED APPLICATIONS

The present application is a national stage application of PCT/JP2014/068928 filed Jul. 16, 2014, and claims priority to Japanese Patent Application No. 2013-161629 filed Aug. 2, 2013, the contents of which are incorporated herein in their entirety.

BACKGROUND

Technical Field

The present invention relates to the technical field of a vehicle lamp having a control unit for controlling a current amount of a drive current supplied to a light source.

CITATION LIST

Patent Document

Patent Document 1: Japanese Patent Laid-Open Publication No. 2004-276738

Related Art

There is a vehicle lamp where a lamp unit having a light source such as an LED (Light Emission Diode), for example, and a controller (control unit) for controlling the lamp unit are disposed in a lamp chamber formed as an internal space of a lamp housing.

In such a vehicle lamp, there is a possibility that, due to the heat generated by the light source when the light source is turned on, the temperature of the light source, especially, the junction temperature exceeds a rated value, and hence, the failure or malfunction of the light source is caused. Further, the reduction in the lifetime of the light source is caused when the light source is operated at a temperature state that does not exceed the rated value but is close to the rated value.

Accordingly, there is a vehicle lamp where a temperature detection unit for detecting (estimating) the temperature of a light source is provided in a controller arranged near the light source and the light amount of the light source is adjusted in accordance with the detection results of the temperature detection unit. For example, in the vehicle lamp disclosed in Patent Document 1, a controller is placed at the rear of a light source arranged in a lamp chamber, the temperature of the lamp chamber is detected by a temperature detection unit provided in the controller, and the light amount of the light source is adjusted on the basis of the detection results of the temperature detection unit.

SUMMARY

In the vehicle lamp as described above, it may be necessary to accurately detect the temperature of the light source by the temperature detection unit and to adjust the light amount of the light source on the basis of the detection results.

One or more embodiments of the present invention suitably detects the temperature of the light source, thereby protecting the light source.

A vehicle lamp according to one or more embodiments of the present invention includes a lamp housing, a lamp unit having a light source and disposed in a lamp chamber formed as an internal space of the lamp housing, and a controller configured to output a drive current that drives a light emission of the light source, having a temperature detector and configured to control a current amount of the drive current on the basis of a detection result of the temperature detector. The controller is disposed above the light source.

In this way, it may be possible to obtain the detection results of the temperature detector, which have a high correlation with the temperature of the light source.

In a vehicle lamp according to one or more embodiments of the present invention, the controller is disposed directly above the light source.

In this way, it may be possible to obtain the detection results of the temperature detector, which have a higher correlation with the temperature of the light source.

In a vehicle lamp according to one or more embodiments of the present invention, the controller is formed in a substantially rectangular parallelepiped shape that is flat, and the controller is arranged so that a flat one side is a horizontal surface facing downward.

In this way, the contact area between the controller and air, which is warmed near the light source unit and is raised, may be increased.

In a vehicle lamp according to one or more embodiments of the present invention, the lamp chamber is formed as a substantially bilaterally-symmetrical space and the light source is disposed at the center in a left-right direction of the lamp chamber.

In this way, the temperature distribution of the lamp chamber may become substantially bilaterally symmetrical, and it may become easy to predict the temperature of each part of the lamp chamber on the basis of the detection results of the temperature detector.

In a vehicle lamp according to one or more embodiments of the present invention, light sources different from the light source are respectively arranged at both left and right sides of the controller.

In this way, a space of the lamp chamber may be effectively utilized.

According to one or more embodiments of the present invention, the air warmed by the light source is raised. Therefore, it is possible to obtain the detection results having a high correlation with the temperature of the light source by detecting the temperature above the light source. As a result, it may be possible to suitably detect the temperature of the light source, thereby protecting the light source.

DETAILED DESCRIPTION

Hereinafter, embodiments of the present invention will be described with reference to the drawings. Regarding to the front-rear direction in the following description, a direction in which light is emitted from the vehicle lamp is referred to as the front. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In addition, in one or more of the embodiments shown below, the vehicle lamp is applied to a headlight of a saddle-type vehicle such as a two-wheeled vehicle or a buggy car. However, the present invention is not limited thereto, but can be applied to the whole illumination devices mounted on a vehicle such as a four-wheeled vehicle or a two-wheeled vehicle. Accordingly, the technical scope of the present invention should not be restrictively interpreted by the examples illustrated below.

Figure 1:
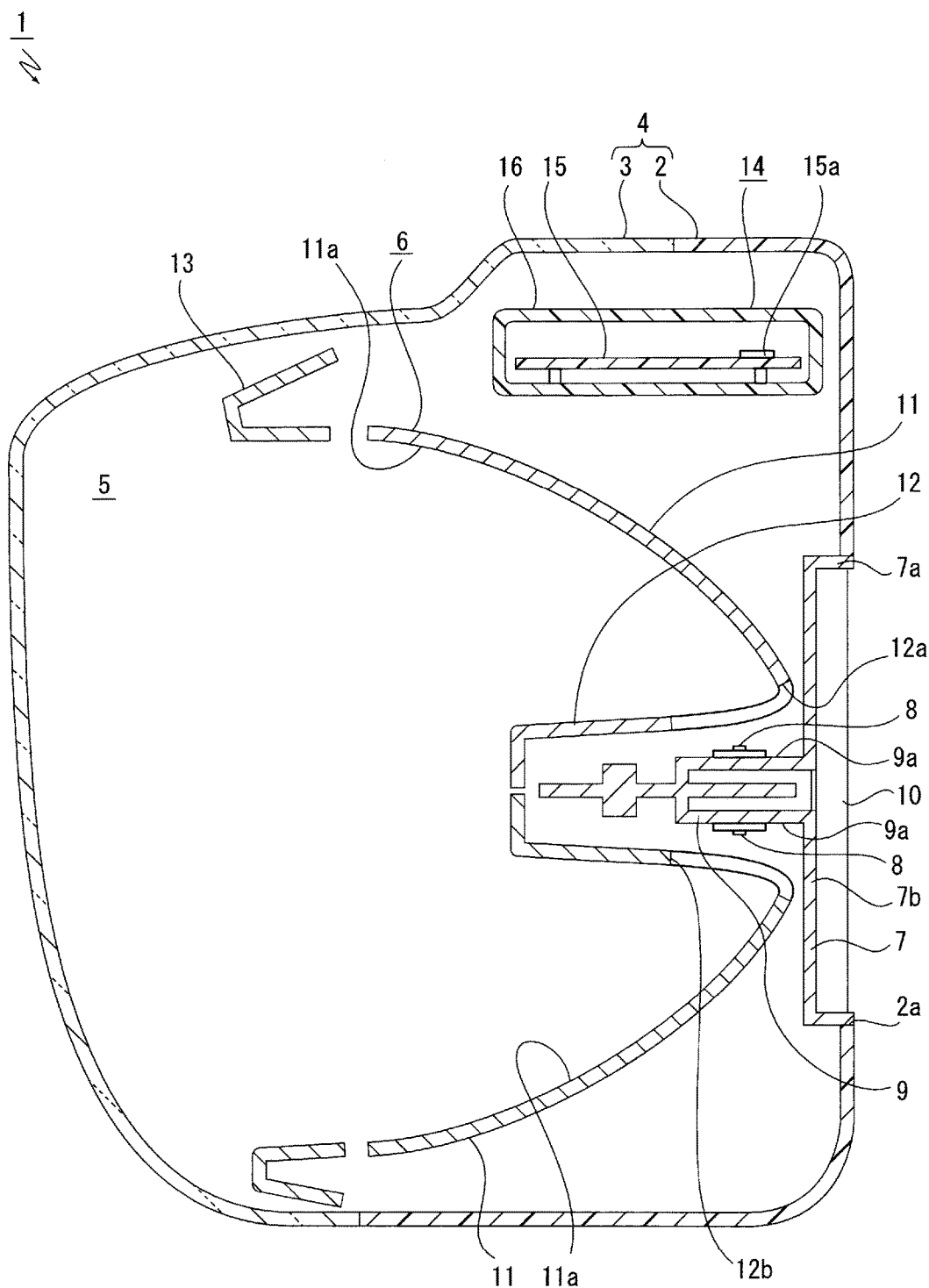
FIG. 1 is a schematic sectional view of a vehicle lamp according to one or more embodiments of the present invention.
Figure 2:
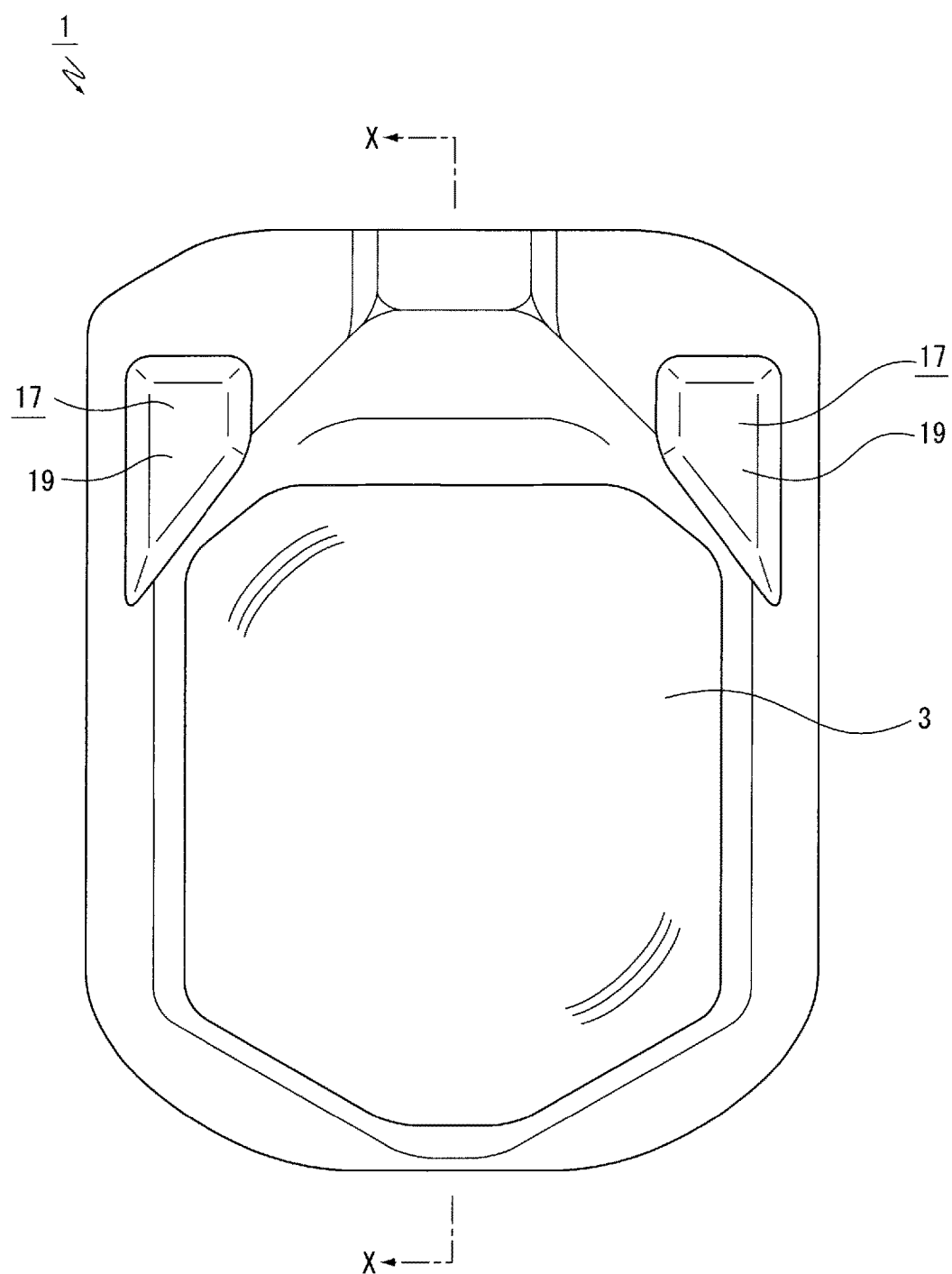
FIG. 2 is an explanatory view schematically showing a state of the vehicle lamp, as seen from the front.
Figure 3:
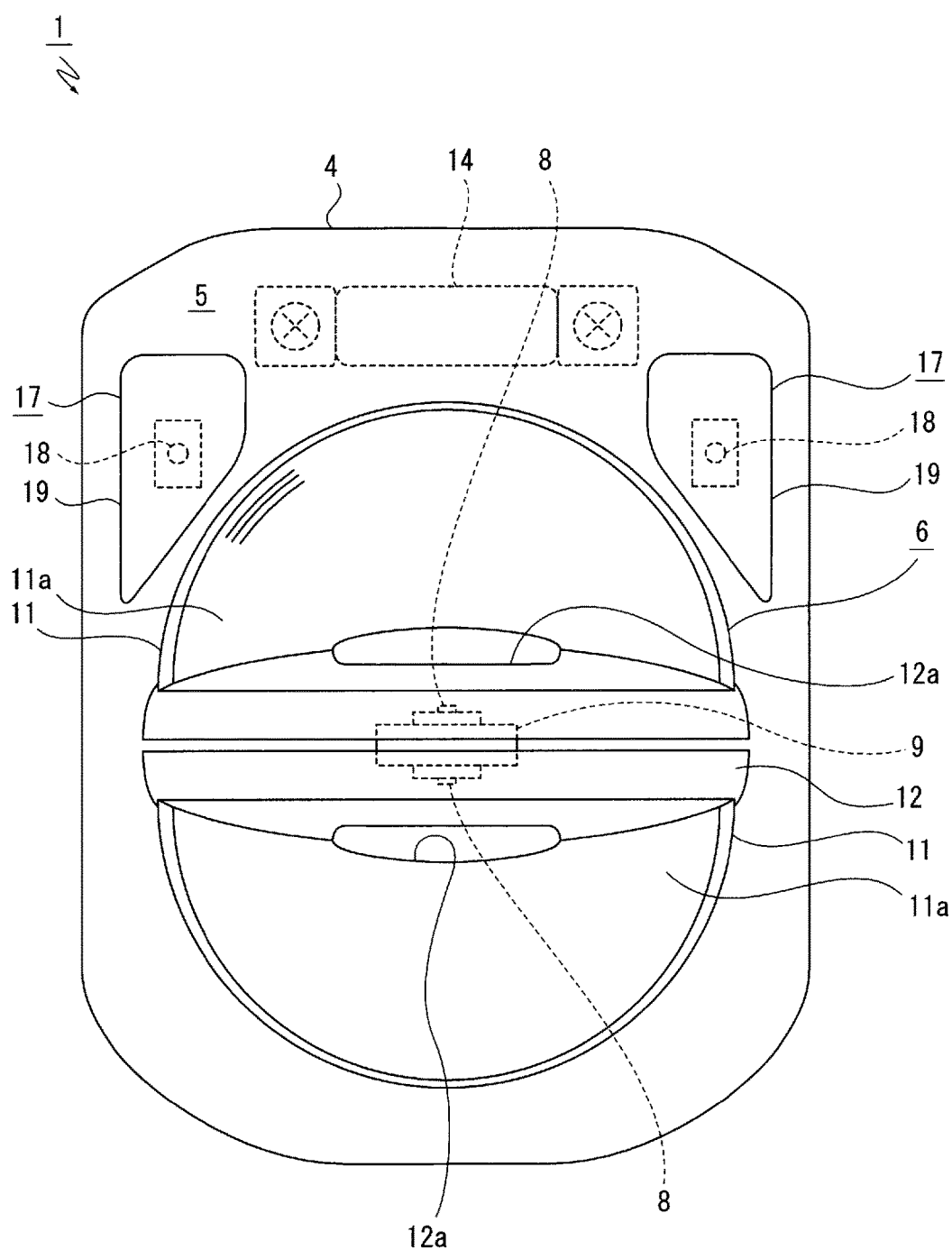
FIG. 3 is an explanatory view showing a positional relationship of each part disposed in the interior of the vehicle lamp, as seen from the front.

As shown in FIGS. 1 to 3, a vehicle lamp 1 includes a lamp housing 4, which is configured by a lamp body 2 having a recess opened to the front and a translucent cover 3 for closing the front opening of the lamp body 2, and predetermined parts arranged in a lamp chamber 5 formed as an interior space of the lamp housing 4. The lamp housing 4 and the lamp chamber 5 are formed in a substantially bilaterally-symmetrical shape. A mounting hole 2a penetrating back and forth is formed at the rear end portion of the lamp body 2 in the lamp housing 4. A lamp unit 6 is attached to the lamp housing 4 from the rear.

The lamp unit 6 includes a back cover part 7 for closing the mounting hole 2a, light sources 8, 8 for emitting light when an irradiation mode of the vehicle lamp 1 is set to a low-beam mode or a high-beam mode, a light source mounting part 9 on which the light sources 8, 8 are mounted, heat sinks 10, 10, . . . for releasing heat generated from the light sources 8, 8, reflectors 11, 11 arranged respectively above and below the light source mounting part 9, and a drive mechanism (not shown) for performing the aiming and leveling.

The back cover part 7 has an annular mounted portion 7a fitted to the lamp body 2 to be in contact with an opening edge of the mounting hole 2a, and a disc-shaped closing portion 7b provided on the inside of the mounted portion 7a. Meanwhile, in order to keep the ventilation between the lamp chamber 5 and the outside, the closing portion 7b may have one or more holes penetrating back and forth, and, for example, may be formed in a grid lattice. As the light sources 8, 8, an LED (Light Emission Diode) is used, for example. The light source mounting part 9 has mounting surfaces 9a, 9a facing upward and downward, respectively. The heat sinks 10, 10, . . . are provided so as to protrude rearward from the closing portion 7b of the back cover part 7 and are located to be spaced apart from side to side, for example.

The light sources 8, 8 are respectively attached to the mounting surfaces 9a, 9a of the light source mounting part 9. The light source mounting part 9 is formed of the same metallic material as the back cover part 7. In this way, the heat generated from the light sources 8, 8 is effectively transmitted to the heat sinks 10, 10, . . . , so that the heat dissipation performance can be improved. Meanwhile, the heat sinks 10, 10, . . . may be formed of the same metallic material as the closing portion 7b and the light source mounting part 9. In this case, the heat generated from the light sources 8, 8 is more effectively transmitted to the heat sinks 10, 10, . . . , so that the heat dissipation performance can be further improved.

The reflector 11 is provided with a recessed reflective surface 11a which has a substantially bisected paraboloid shape. A recessed closing portion 12 opened rearward is provided at the rear end portions of the reflectors 11, 11. The light sources 8, 8 and the light source mounting part 9 are located on the inside of the closing portion 12. The closing portion 12 prevents the light emitted from the light sources 8, 8 from being unnecessarily irradiated to the outside and prevents the light sources 8, 8 and the light source mounting part 9 from being visible from the outside. Passing holes 12a, 12a for passing the light emitted from the light sources 8, 8 are formed in the closing portion 12 so as to be vertically spaced apart. The light emitted from the light sources 8, 8 respectively passes through the passing holes 12a, 12a of the reflectors 11, 11 and then is reflected toward the translucent cover 3 by the reflective surfaces 11a, 11a.

In the vehicle lamp 1, when a drive mechanism (not shown) is operated to perform the aiming or leveling, the lamp unit 6 is pivoted with respect to the lamp housing 4 in the left-right direction or in the vertical direction, and hence, an optical axis of light, which is emitted from the light sources 8, 8 and reflected by the reflective surfaces 11a, 11a, is changed in accordance with the pivot direction of the lamp unit 6.

An extension 13 for preventing each part arranged at an outer peripheral side of the reflectors 11, 11 from being visible from the front of the lamp housing 4 is disposed in the lamp chamber 5. The extension 13 is attached to the lamp housing 4.

Figure 4:
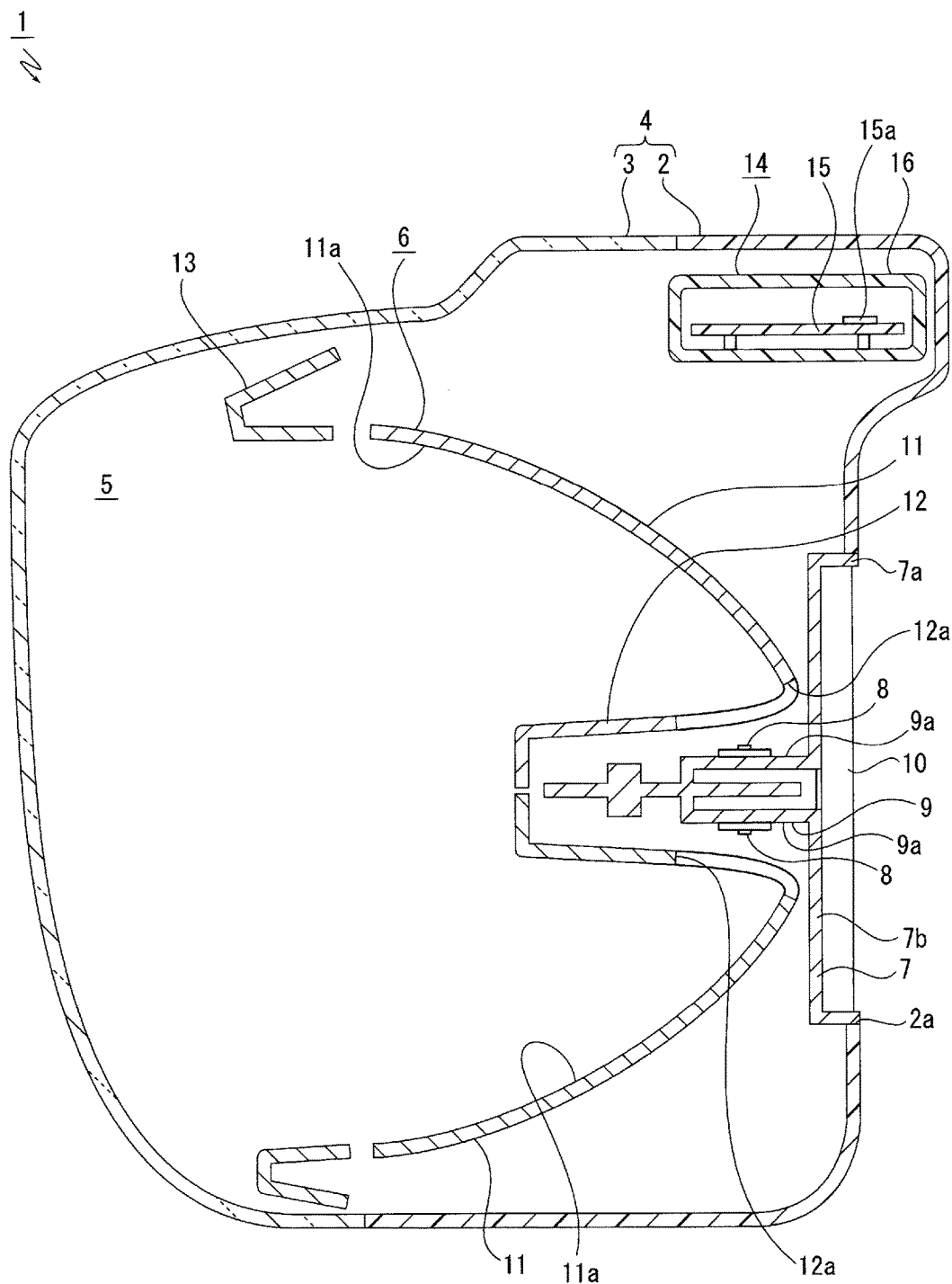
FIG. 4 is a schematic sectional view showing a vehicle lamp according to one or more embodiments of the present invention.

Further, as shown in FIGS. 1 and 3, in the lamp chamber 5, a control unit 14 for performing the light distribution control or light quantity control of the light sources 8, 8 is disposed directly above the light sources 8, 8. Meanwhile, it is not essential that the control unit 14 is disposed directly above the light sources 8, 8, so long as the control unit 14 is arranged above the light sources 8, 8. For example, as shown in FIG. 4, the control unit 14 may be disposed to be slightly shifted in the front-rear direction with respect to the light sources 8, 8.

The control unit 14 includes a circuit board 15 on which predetermined circuit elements are mounted, and a case 16 which is formed in a substantially rectangular parallelepiped shape that is flat. The case 16 covers the whole circuit board 15, and the size in the vertical direction thereof is smaller than the size in the front-rear direction and left-right direction thereof. The control unit 14 is attached to the lamp housing 4 in such a way that flat surfaces (an upper surface and a lower surface) become a horizontal surface.

The circuit board 15 serves as a driver for driving the light emission of the light sources 8, 8. The circuit board 15 includes a DC/DC converter for obtaining a drive voltage of the light sources 8, 8 from a battery power source mounted on a vehicle. The circuit board 15 supplies a drive current as an output of the DC/DC converter to the light sources 8, 8. Specifically, the circuit board 15 includes the DC/DC converter and a control unit (e.g., CPU). The DC/DC converter is configured as, for example, a switching regulator to output a necessary voltage.

The control unit is configured to control the duty of the pulse for controlling the ON/OFF of a switching element of the DC/DC converter in accordance with the detection results of the drive current supplied from the DC/DC converter to the light sources 8, 8, thereby stabilizing the drive current to be outputted.

A circuit element as a temperature detection unit (temperature sensor) 15a for detecting the temperature is provided in the circuit board 15 (the temperature detection unit 15a is schematically shown in FIGS. 1 and 4). A connector (not shown) is attached to the circuit board 15. The circuit board 15 is respectively connected to the light sources 8, 8 via the connector and a cable (not shown). In this way, the circuit board 15 supplies the drive current to the light sources 8, 8.

As a process of protecting the light sources, for example, the control unit 14 reduces the drive current of the light sources 8, 8 on the basis of the detection results by the temperature detection unit 15a. For example, as a derating control, a reference level for the stabilized output is changed in accordance with the detected temperature, thereby reducing the drive current outputted from the DC/DC converter.

As shown in FIGS. 2 and 3, in the lamp chamber 5, light source units 17, 17 are disposed at both left and right sides of the control unit 14. The light source unit 17 includes a light source 18 different from the light source 8 and a translucent cover 19 located in front of the light source 18. The light source unit 17 can be utilized as a light source for various lamps in accordance with the types and applications of the vehicle lamp 1. For example, the light source unit 17 is utilized as a light source for a clearance lamp or a turn signal lamp.

Meanwhile, as the drive current for driving the light sources 18, 18 of the light source units 17, 17, the drive current generated in the control unit 14 may be used, or, the drive current generated by a dedicated drive circuit or the like provided separately from the control unit 14 may be used. These drive currents are supplied to the light sources 18, 18 via a cable or the like (not shown).

As described above, the light source units 17, 17 are disposed at both left and right spaces of the control unit 14. Therefore, the space of the lamp chamber 5 is effectively utilized, and thus, it is possible to reduce the size of the vehicle lamp 1.

Hereinafter, the vehicle lamp 1 in a state where the light sources 8, 8 are driven is described.

As described above, the lamp unit 6 is configured so that the light sources 8, 8 are respectively attached to the mounting surfaces 9a, 9a of the light source mounting part 9. Further, the lamp unit 6 is configured so that both of two light sources 8, 8 emit light when an irradiation mode of the vehicle lamp 1 is set to a so-called high-beam mode, and only the light source 8 attached to the upper mounting surface 9a of the light source mounting part 9 emits light when an irradiation mode of the vehicle lamp 1 is set to a so-called low-beam mode.

When a drive current is supplied to the light source 8 of the lamp unit 6 to cause the light source 8 to emit light, the light source 8 generates heat, and hence, air near the light source 8 is warmed. Since the air warmed moves upward, convection of air is generated in the lamp chamber 5. As time elapses from the driving of the light source 8 and the temperature of the light source 8 rises, the temperature of the lamp chamber 5 rises. When the temperature of the lamp chamber 5 detected by the temperature detection unit 15a exceeds a certain threshold, the light source 8 is estimated to be in an excessive temperature state. Therefore, in order to prevent the reduction in lifetime or the malfunction of the light source 8, a control of reducing the drive current of the light source 8 by the control unit 14 is performed.

Meanwhile, according to one or more embodiments of the present invention, the correlation between the temperature of the lamp chamber 5 and the temperature of the light source 8 is previously investigated, and then, the above-described threshold is determined on the basis of the investigation results and a rated value of the light source 8. Air warmed by the light source 8 is first directed to an upper side of the light source 8. The temperature in the upper side of the light source 8, which is detected by the temperature detection unit 15a, has a high correlation with the temperature of the light source 8. Therefore, the temperature detection results in the upper side of the light source 8 indicate the temperature of the light source 8 with high accuracy.

Accordingly, the current value is properly controlled by a control of increasing or decreasing the current amount (current value) of the drive current supplied to the light source 8 in accordance with the detection results by the temperature detection unit 15a.

As described above, the temperature detection unit 15a provided in the control unit 14 is disposed above the light sources 8, 8. Therefore, the temperature detection unit 15a can obtain the detection results that have a high correlation with the temperature of the light sources 8, 8, as compared to a case where the control unit 14 is disposed behind or below the light sources 8, 8. In this way, the current control can be suitably performed in accordance with the temperature of the light sources 8, 8, so that the light sources 8, 8 can be protected. For example, a suitable derating can be performed, and hence, the lifetime of the light sources 8, 8 can be prolonged.

Further, since the temperature detection unit 15a provided in the control unit 14 is disposed directly above the light sources 8, 8, the temperature detection unit 15a can obtain the detection results that have a high correlation with the temperature of the light sources 8, 8. In this way, the temperature of the lamp chamber 5 can be more suitably detected, so that the light sources 8, 8 can sufficiently protected.

Furthermore, as described above, the control unit 14 is attached so that flat surfaces become a horizontal surface. Therefore, the contact area between the control unit 14 and air, which is warmed near the light sources 8, 8 and is raised, is increased. As a result, the temperature of the lamp chamber 5 is more suitably detected, so that the light sources 8, 8 can be more sufficiently protected.

Furthermore, since the lamp chamber 5 is formed as a substantially bilaterally-symmetrical space and the light sources 8, 8 are disposed at the center in the left-right direction of the lamp chamber 5, the temperature distribution of the lamp chamber 5 becomes substantially bilaterally symmetrical and it is easy to predict the temperature of each part of the lamp chamber 5 on the basis of the detection results of the temperature detection unit 15a. In this way, the temperature control by the control unit 14 can be performed with high accuracy.

In the above description, as shown in FIG. 1, an example has been illustrated where the temperature detection unit 15a is mounted on an upper surface of the circuit board 15. However, the temperature detection unit 15a may be mounted on a surface (lower surface) of the circuit board 15, which faces the light sources 8, 8. In this case, since the temperature detection unit 15a is located on the side of the light sources 8, 8, the temperature of the lamp chamber 5 can be more suitably detected.

Furthermore, in addition to the configuration that the temperature detection unit 15a is mounted on the lower surface of the circuit board 15, a hole is formed in a lower surface of the case 16 of the control unit 14. In this way, air, which is warmed by the heat generated in the light sources 8, 8 and is raised, is likely to be in contact with the temperature detection unit 15a, so that the temperature of the lamp chamber 5 can be more suitably detected.

In the above-described embodiments, for example, as shown in FIG. 4, the control unit 14 can be shifted in the front-rear direction, so long as the control unit 14 is disposed above the light sources 8, 8. In the case where the control unit 14 is located substantially near the center in the left-right direction, one or more advantages of one or more embodiments of the present invention can be achieved even when the control unit 14 is disposed to be slightly shifted in the left-right direction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE NUMERALS LIST

1 Vehicle Lamp
4 Lamp Housing
5 Lamp Chamber
6 Lamp Unit
8 Light Source
14 Control Unit
15a Temperature Detection Unit
18 Light Source

What is claimed is:

1. A vehicle lamp configured to be disposed on a vehicle, comprising:
a lamp housing;
a lamp unit having a light source and disposed in a lamp chamber formed as an internal space of the lamp housing; and
a controller configured to output a drive current that drives a light emission of the light source,
wherein the controller comprises a temperature sensor,
wherein the controller is configured to control an amount of the drive current on the basis of a sensing result of the temperature sensor,
wherein the controller is disposed above the light source with respect to an orientation of the vehicle lamp when disposed on the vehicle,
wherein the controller comprises a circuit board including the temperature sensor,
wherein the circuit board and the light source are connected via a cable,
wherein a distance between the circuit board and a top of the lamp housing is shorter than a distance between the circuit board and the light source when disposed on the vehicle,
wherein the controller comprises a case that covers an entirety of the circuited board,
wherein the case has a flat shape, and
wherein a largest surface of the case is a horizontal surface facing downwards with respect to the orientation of the vehicle lamp when disposed on the vehicle.

2. The vehicle lamp according to claim 1, wherein the controller is disposed above the light source so as to coincide with a vertical line that passes through the light source with respect to the orientation of the vehicle lamp when disposed on the vehicle.

3. The vehicle lamp according to claim 1,
wherein the controller is formed in a substantially rectangular parallelepiped shape that is flat, and
wherein the controller is arranged so that a flat one surface is a horizontal surface facing downward.

4. The vehicle lamp according to claim 1,
wherein the lamp chamber is formed as a substantially bilaterally-symmetrical space, and
wherein the light source is disposed at the center in a left-right direction of the lamp chamber.

5. The vehicle lamp according to claim 1, wherein light sources different from the light source are respectively arranged at both left and right sides of the controller.

6. The vehicle lamp according to claim 2,
wherein the controller is formed in a substantially rectangular parallelepiped shape that is flat, and
wherein the controller is arranged so that a flat one surface is a horizontal surface facing downward.

7. The vehicle lamp according to claim 2,
wherein the lamp chamber is formed as a substantially bilaterally-symmetrical space, and
wherein the light source is disposed at the center in a left-right direction of the lamp chamber.

8. The vehicle lamp according to claim 3,
wherein the lamp chamber is formed as a substantially bilaterally-symmetrical space, and
wherein the light source is disposed at the center in a left-right direction of the lamp chamber.

9. The vehicle lamp according to claim 6,
wherein the lamp chamber is formed as a substantially bilaterally-symmetrical space, and
wherein the light source is disposed at the center in a left-right direction of the lamp chamber.

10. The vehicle lamp according to claim 2, wherein light sources different from the light source are respectively arranged at both left and right sides of the controller.

11. The vehicle lamp according to claim 3, wherein light sources different from the light source are respectively arranged at both left and right sides of the controller.

12. The vehicle lamp according to claim 4, wherein light sources different from the light source are respectively arranged at both left and right sides of the controller.

13. The vehicle lamp according to claim 6, wherein light sources different from the light source are respectively arranged at both left and right sides of the controller.

14. The vehicle lamp according to claim 9, wherein light sources different from the light source are respectively arranged at both left and right sides of the controller.

15. The vehicle lamp according to claim 1, wherein the controller is positioned, with respect to the light source, in a direction that heat from the light source rises.

16. The Vehicle lamp according to claim 1, wherein the case is formed in a substantially rectangular parallelepiped shape.

17. The vehicle lamp according to claim 1, wherein the case is disposed in the lamp housing.

* * * * *